Figure 9:
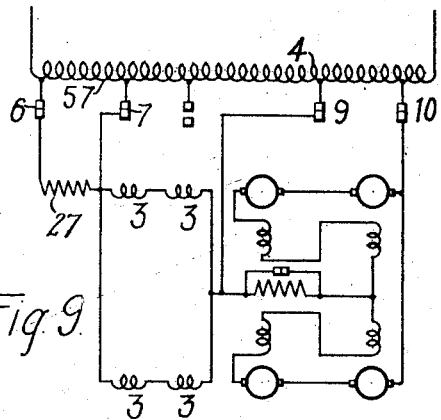

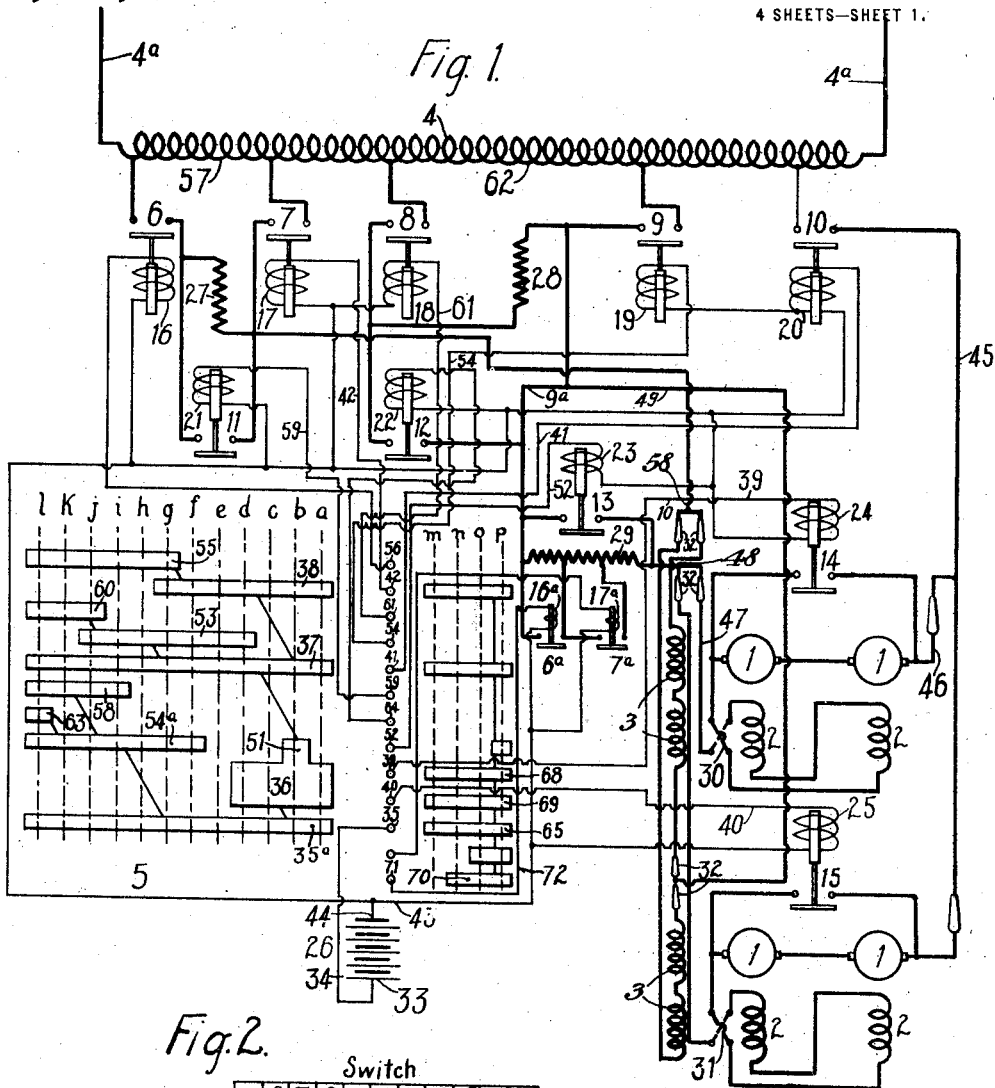

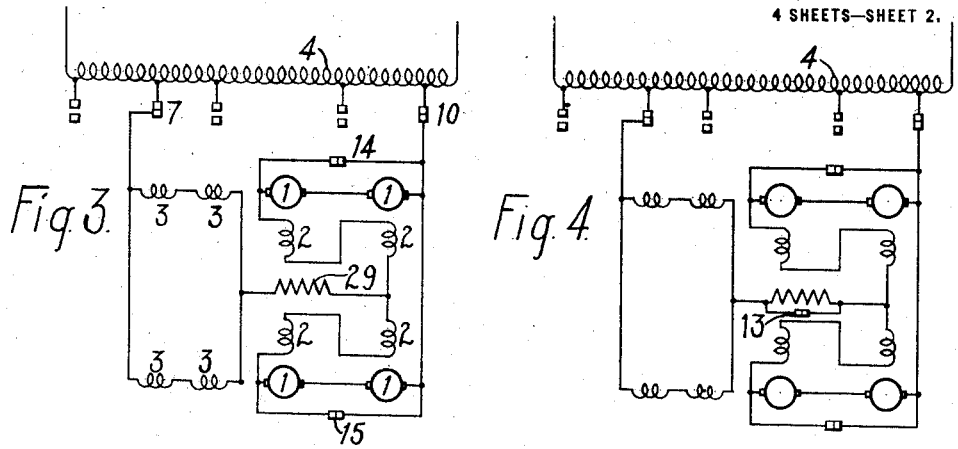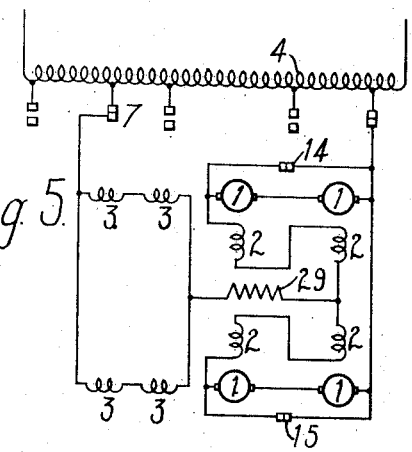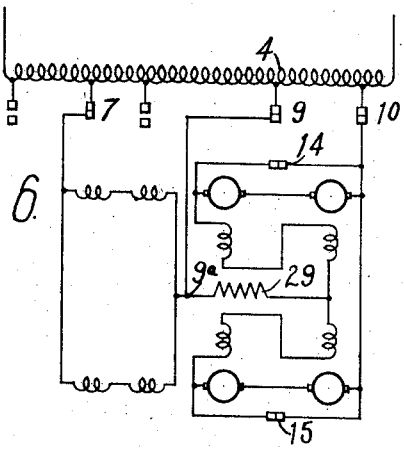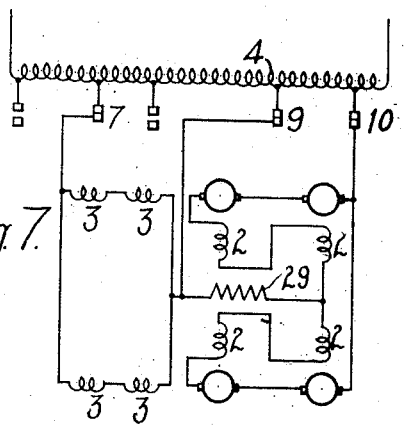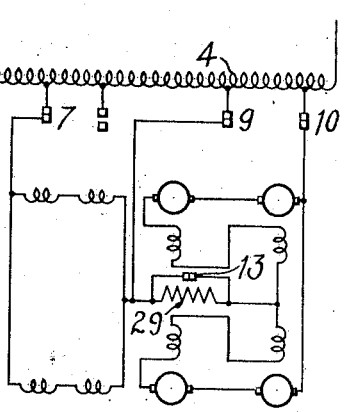

R. E. HELLMUND.
SYSTEM AND METHOD OF CONTROL.
APPLICATION FILED DEC. 31, 1913.

1,246,423.

Patented Nov. 13, 1917.
4 SHEETS—SHEET 3.

WITNESSES:
Q. J. Fitzgerald
W. R. Coley

INVENTOR
Rudolf E. Hellmund
BY
Wesley G. Carr
ATTORNEY

R. E. HELLMUND.
SYSTEM AND METHOD OF CONTROL.
APPLICATION FILED DEC. 31, 1913.
1,246,423.
Patented Nov. 13, 1917.
4 SHEETS—SHEET 4.
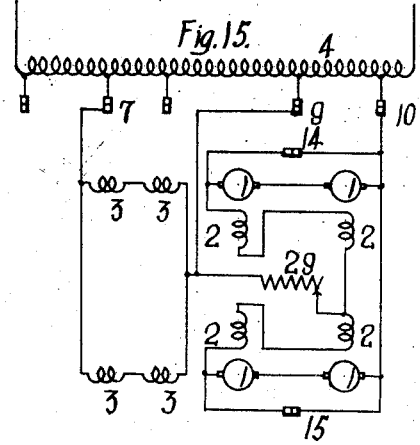
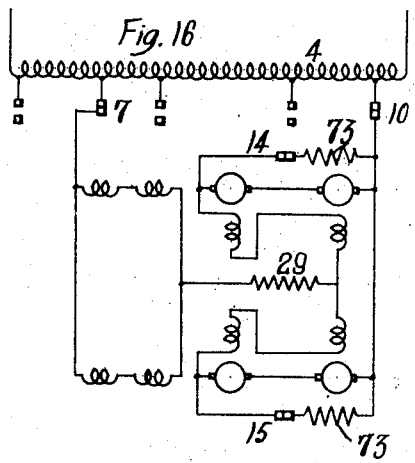
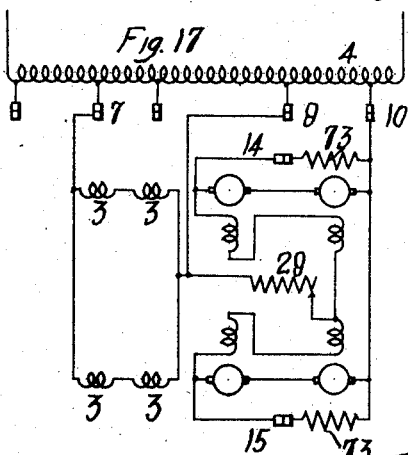

UNITED STATES PATENT OFFICE.

RUDOLF E. HELLMUND, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM AND METHOD OF CONTROL.

1,246,423.   Specification of Letters Patent.   Patented Nov. 13, 1917.

Application filed December 31, 1913. Serial No. 809,653.

*To all whom it may concern:*

Be it known that I, RUDOLF E. HELLMUND, a subject of the German Empire, and a resident of Pittsburgh, in the county of Allegheny and State of Pennsylvania, have invented a new and useful Improvement in Systems and Methods of Control, of which the following is a specification.

My invention relates to systems and methods of control, and it has special reference to the control of alternating current motors of the commutator type and similar machines.

One object of my invention is to provide a system and method of the above-indicated character involving apparatus which shall be relatively simple and inexpensive in construction and which, in operation, shall obviate the necessity of switching heavy currents.

Another object of my invention is to provide an efficient method of operating a motor of the class under consideration during the starting period.

Another object of my invention is to provide, in a system of the above-indicated type, simple means for effecting regeneration to the line.

The motor I prefer to employ in the control system hereinafter set forth comprises an armature of the usual series-wound direct-current, or a similar type, and a stator having an exciting or torque-producing winding and a compensating or inducing winding having preferably approximately twice the number of turns in the armature winding.

As is well understood, it is desirable, during the starting period of an alternating current motor of the commutator type, to weaken the field flux, in order to permit the passage through the armature winding of a current heavy enough to produce a sufficient starting torque without excessive transformer action in the coils short-circuited by the brushes and consequent undue sparking at the brushes, as would be the case with a heavy field flux present.

According to my present invention, in brief, the motor is started as a repulsion motor and undergoes a transition to the "double-fed" connection, that is, a connection whereby certain sets of windings of the motor are severally disposed across different portions of an auto-transformer or other suitable source of alternating current. During the transition, the current in the inducing field is maintained at values proper for good commutation.

In the accompanying drawings, by way of illustration, I show the application of the above-stated principles to the operation of an equipment comprising two parallel sets of two series-connected motors each. It will be understood, however, that my invention is not limited to any particular number or arrangement of motors.

In the drawings, Figure 1 is a diagrammatic view of one form of control system arranged in accordance with my invention; Fig. 2 is a chart of well-known form showing the operating sequence of switches; Figs. 3 to 14, inclusive, are diagrammatic views showing the circuit connections during the various operating positions of the master controlling means; Fig. 15 is a diagrammatic view of one set of circuit connections for regeneration; Fig. 16 is a diagrammatic view of a modification of the starting connections of Fig. 3; and Fig. 17 is a diagrammatic view of a modification of the regenerative connections of Fig. 15.

Referring to the drawings, the system here shown comprises a plurality of suitable electric motors severally having armature windings 1, exciting windings 2 and inducing windings 3; an auto-transformer 4 that is suitably energized from a supply-circuit $4^a$, or other similar apparatus for supplying energy to the motor; a master controller 5 adapted to occupy a plurality of motor-operating positions $a$ to $l$ inclusive, and a plurality of regenerative positions $m$, $n$, $o$ and $p$; a plurality of suitable relays or electrically controlled switches 6 to 15 inclusive, for making the various accelerating circuit connections, and a plurality of additional switches $6^a$ and $7^a$, for use in regeneration, as hereinafter set forth; a plurality of coils 16 to 25, inclusive, severally associated with the switches 6 to 15, inclusive, and adapted to close them when energized from a suitable source of energy, such as storage battery 26 through the controller 5; and a plurality of resistors 27, 28 and 29, for purposes to be hereinafter specified.

As hereinbefore stated, the armature winding 1 may be of the usual series direct-current or any other similar type, and the inducing winding 3 has a greater number of turns than the armature winding, preferably having approximately twice as many. The other devices and apparatus mentioned are old and familiar in the art and no description thereof is deemed necessary here. In addition to the main control switches 6 to 15, inclusive, a plurality of reversing switches 30 and 31 and cutouts 32 are preferably provided. The auxiliary control system, shown as comprising the master controller 5, the coils 16 to 25, inclusive and the battery 26, may be of any well-known type and I do not wish to limit myself to the system that is shown in the drawings merely as an example.

The general operation of the system may be set forth as follows:

As a method for weakening the field at starting, the field windings are initially disposed in series with the short-circuited armature winding and a suitable resistor across a portion of the transformer winding, the resistor being short-circuited after starting. A preferably intermediate point in the transformer winding is then connected to the inner end of the inducing winding, this last-named connection being also usable as a satisfactory initial starting connection, and the armature short-circuit is opened, whereby it will be observed that the exciting field winding, the resistor and a portion of the transformer winding have been substituted for the short-circuit, and that the inducing winding is connected across a contiguous portion of the transformer winding.

The second insertion of the resistor serves to adjust the phase of the current in the exciting field winding to be approximately the same as the phase of the armature current and also is useful in reducing the exciting winding current to a point intermediate the values of the currents in the inducing winding and the armature, both of which conditions I have found to be advantageous for satisfactory operation.

Assuming a "double-fed" connection of the motor, it will be observed that, by reason of the mutual transformer action of the armature and inducing windings and, in view of the ratio of respective turns, the current in the inducing winding is approximately one-half of the armature current.

Now consider the armature winding to be disposed in series across one portion of an auto-transformer, for instance, and the inducing winding to be connected across a contiguous part, so that a common lead is employed for the intermediate connection which extends from a point between the field windings and the transformer winding. It will be noted that the common lead carries the difference between the armature and the inducing field-winding currents, namely, approximately one-half of the armature current.

By shifting the common lead so that the entire transformer winding is connected across the inducing winding, a voltage of about half the value of that of the source is, consequently, inductively obtained in the armature winding; whereas, by shifting the common lead to the other extreme position, so that the inducing winding is short-circuited, the full voltage of the transformer winding is conductively impressed upon the armature circuit. For obvious practical reasons, it would not be expedient to utilize either extreme position, but intermediate them there is a sufficient range for first inductively and then conductively controlling the voltage impressed upon the armature winding and, therefore, controlling the speed of the motor.

For regenerative purposes, I employ a simple adaptation of one of the above-mentioned starting connections, as hereinafter explained.

Assuming that the auto-transformer 4 is suitably energized and that the master controller 5 is moved into its first position $a$, an auxiliary circuit connection is established from a terminal 33 of the battery 26, through a conductor 34, a control finger 35 and a contact member $35^a$, contact members 36, 37 and 38, corresponding control fingers 39 and 40, 41 and 42, corresponding magnet coils 24 and 25, 20 and 17, and a conductor 43 to the opposite terminal 44 of the battery 26, thereby closing main switches 14 and 15, 10 and 7. A main circuit connection is thus established from the auto-transformer 4, through the switch 10, conductor 45, conductor 46, the series-connected armature windings 1 of one of the sets of parallel-connected motors, the switch 14 that serves to short-circuit the said armature winding, thence through one portion of the reversing switch 30, exciting field windings 2, another portion of the reversing switch 30, and conductor 47 to a junction point 48. A second and similar circuit through the other set of motors is also established from the conductor 45 to the junction point 48. From this point, circuit is continued through the resistor 29, a conductor 49, the two parallel-connected sets of inducing field windings 3, a junction point 50, and the switch 7 to the auto-transformer 4. In this way, all the windings of the sets of motors are severally connected in series with the resistor 29 and the connections of Fig. 3 of the drawing are established.

In position $b$ of the controller 5, the magnet coil 23, in addition to those already energized, is connected across the battery 26 by means of a contact member 51 making contact with a control finger 52. The main switch 13 is thus closed, short-circuiting the resistor 29, and the arrangement of Fig. 4 is obtained.

In position $c$, the connections are momentarily the same as in position a, as shown in Fig. 5.

In position d, the coil 19 is energized through a contact member 53, and a control finger 54 and the main switch 9 is closed, thereby connecting an intermediate point of the auto-transformer 4 to a point 9ª in the motor circuit that separates the parallel-connected sets of inducing windings 3 from the resistor 29 and the remaining sets of motor windings, giving the circuit connections shown in Fig. 6. This connection is also satisfactory as a starting connection, and may be employed as such.

In position e, the contact member 36 of the controller 5 breaks contact with the control fingers 39 and 40 thus deënergizing the magnet coils 24 and 25 and allowing the switches 14 and 15 to open, whereby the short-circuiting connections of the sets of armature windings 1 are removed and the arrangement of Fig. 7 is provided. It will thus be seen that a circuit comprising a portion of the transformer winding 4, the resistor 29, and the corresponding exciting field windings 2 has been substituted for the respective short-circuits across the sets of armature windings 1; also that the sets of inducing windings 3 are severally connected to a portion of the auto-transformer 4 that is separate from the portion that is connected to the armature circuits. In brief, a "double-fed" connection is secured. The arrangement of Fig. 7 may also be used for starting, if desired.

In position f, the main switch 13 is closed by reason of the energization of the coil 23 through a contact member 54ª and the control finger 52, thereby short-circuiting the resistor 29. (See Fig. 8.)

In position g, the magnet coil 16 is energized by means of a contact member 55 and a control finger 56, thus closing the switch 6 and connecting an additional portion 57 of the auto-transformer 4 that is contiguous to the portion connected across the inducing field windings 3, across the resistor 27 and the closed switch 7. (See Fig. 9.)

Figure 10:
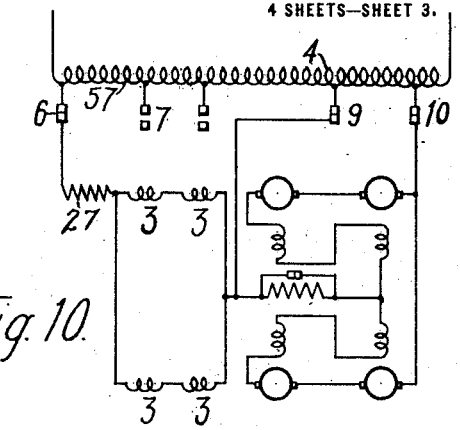

In position h, the contact member 38 of the controller breaks contact with the control finger 42, thus deënergizing the magnet coil 17 and allowing the switch 7 to open, whereby the portion 57 of the auto-transformer 4 and the resistor 27 are connected in circuit with the sets of inducing windings 3, as shown in Fig. 10.

In position i, the magnet coil 21 is energized by means of a contact member 58 making contact with a control finger 59, thus closing the switch 11, whereby the resistor 27 is short-circuited and an increased electro-motive force is impressed across the sets of inducing windings 3. (See Fig. 11.)

It will be understood that the function of the resistor 27 is to limit the flow of current incident to the establishment of the new connections just specified.

Figure 12:
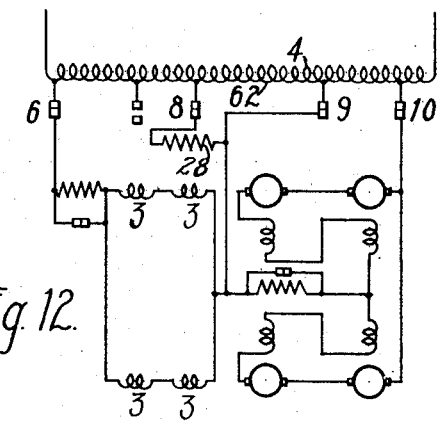

In position j, the magnet coil 18 is energized through a contact member 60 and a control finger 61, thus closing the switch 8, whereby a section 62 of the portion of the auto-transformer that is connected across the sets of inducing windings 3 is connected in circuit with the resistor 28 and the switch 9, as shown in Fig. 12.

Figure 13:
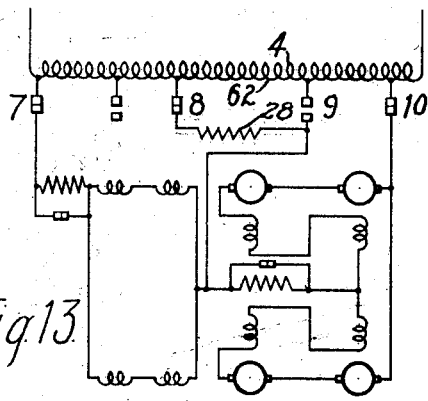

In position k, the contact member 53 breaks contact with the control finger 54, thus deënergizing the magnet coil 19, whereby the switch 9 is opened and the section 62 of the auto-transformer, together with the resistor 28, is connected in the armature circuits. (Fig. 13.)

Figure 14:
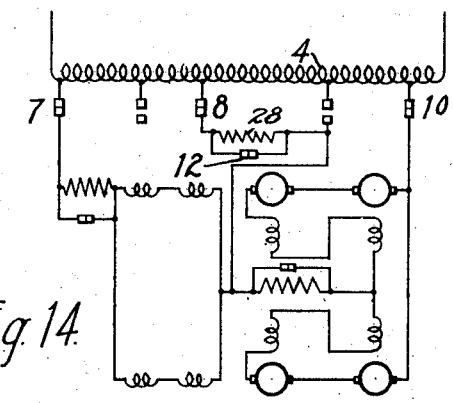

In position l, the magnet coil 22 is energized through a contact member 63 and a control finger 64, whereby the switch 12 is closed and the resistor 28, consequently, is short-circuited, as shown in Fig. 14. In this way, an increase of electromotive force is directly impressed upon the armature circuits. The resistor 28 serves the same purpose as the resistor 27, as hereinbefore explained.

Figure 11:
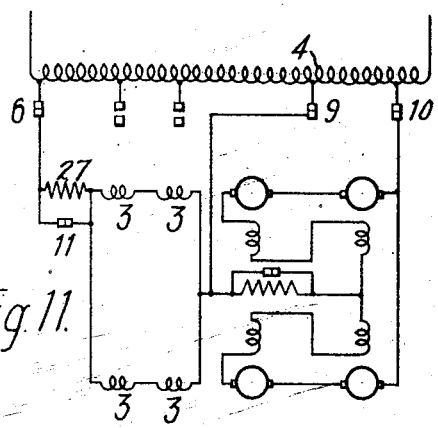

It thus appears that, in the control system set forth, the sets of motors are started as repulsion motors with their armatures short-circuited and with the field fluxes weakened by reason of the inclusion of a resistor in the series connection of the windings. The resistor is then short-circuited, which is equivalent to an increase of impressed voltage. The sets of motors are then changed over to the "double-fed" connection, the sets of inducing windings forming a separate circuit and the resistor being included in the remaining motor circuits, for reasons hereinbefore specified. The resistor is then again excluded. An increased voltage is next impressed upon the inducing windings, whereby an increased voltage is inductively impressed across the armature windings, thus causing an increase in the speed of the motors. Finally, a section of the transformer winding that is connected to the sets of inducing windings, is transferred to the armature circuits, thereby simultaneously decreasing the voltage impressed upon the sets of exciting windings and conductively increasing the voltage impressed upon the armature terminals, thus further increasing the speed of the motors. The position shown in Figs. 8, 11 and 14 are running positions, the other figures illustrating starting or transition connections.

Referring to the regenerative circuits of Fig. 1, and assuming that the master controller has been moved to its "off" position, permitting all the switches to open, and is moved to position m, the first regenerative or braking position; under these conditions, a circuit is established from the positively energized control finger 35, through contact member 65 of the master controller to contact members 66, 67, 68 and 69, thereby energizing the coils of magnet switches 7, 10, 14 and 15 by means of circuits already traced and giving the connections of Fig. 6. To increase the rate of retardation or to prevent the regenerated current from becoming undesirably low, the master controller may be successively moved to its positions n, o and p, to vary the resistor 29, as explained below.

In position n, a circuit is completed from an energized contact member 70, through control finger 71 and conductor 72 to the coil 16ᵃ of the magnet switch 6ᵃ, thus closing the switch and short-circuiting a portion of the resistor 29. In the other braking positions of the master controller, the switches 7ᵃ and 13 are similarly actuated to gradually exclude the resistor, thereby regeneratively braking the motor until a predetermined relatively low speed is reached, when the mechanical brakes, (not shown) with which railway cars are customarily provided, may conveniently and efficiently be applied to stop the car. It should be noted that, whereas, I have shown a set of regenerative circuits wherein the motor armatures are short-circuited, this condition is not essential, and the connection of Fig. 7, wherein the armature short-circuits are removed, may be employed, if desired. It will, of course, be understood that the resistor 29 may be short-circuited in any number of steps, the number shown being selected merely for illustrative purposes.

Reference may now be had to Fig. 15, wherein the above-described regenerative system is diagrammatically shown. As will be noted, this figure is an adaptation of the connections of Fig. 6, the difference residing in the provision of a variable connection for the resistor 29, thereby permitting a regulation of the rate of retardation of the motors, which may be made either automatic or manual, as desired.

Fig. 16 shows a modified starting connection, wherein suitable resistors 73 are disposed in the local circuits of the short-circuiting switches 14 and 15, as indicated in dotted lines at 73 in Fig. 1. By this means, the motor is still started as a repulsion motor, but, when the switches 14 and 15 are opened, the resultant change of electro-motive force of the armature is sufficient to cause an appreciable increase in speed. The circuit connections just described serve, therefore, to impart an additional accelerating step to the control system.

The resistors 73 may also be employed to good advantage in regeneration, as shown in Fig. 17, by reason of the fact that the counter-electro-motive force induced in the machines may not be exactly in opposition to respective impressed electro-motive force, and proper correction of this undesirable condition may be effected by using a suitable resistance or an inductance in the circuit of either the armature or of the inducing winding 3.

Variations in the circuit connections and in the arrangement of the control positions may be employed within the spirit and scope of my invention, and I desire that only such limitations shall be imposed as are indicated in the appended claims.

I claim as my invention:

1. The combination with an alternating current motor of the commutator type having a plurality of field windings and an initially short-circuited armature winding, of a resistor disposed in series with both field windings at starting, means for excluding said resistor, means for including the same resistor in circuit with one only of said windings and impressing a substantially constant voltage thereon, and means for opening said short-circuiting connection.

2. The combination with an alternating current motor of the commutator type having an exciting and an inducing winding on its stator and having an initially short-circuited armature winding, of a resistor disposed in series with both field windings at starting, a source of alternating electromotive force, switching means for excluding said resistor, switching means for including the same resistor in circuit with said exciting winding and impressing a portion of the electromotive force from said source thereon, switching means for opening said short-circuiting connection, and means for varying the electromotive force from said source that is impressed upon said armature winding.

3. The method of operating an alternating current motor of the commutator type provided with an exciting winding and an inducing winding having a greater number of turns than the armature winding on its stator from a transformer winding that consists in the following steps: first, connecting all the motor windings in series with a resistor across a portion of said transformer winding, the armature winding being short-circuited: second, connecting an intermediate point in said transformer winding to a point separating said inducing winding from the remaining motor windings and said resistor; third, removing the short-circuiting connection from said armature winding; fourth, short-circuiting said resistor; fifth, bridging an additional portion of said transformer winding through a second resistor across a portion of the conductor connecting the outer end of the inducing winding to said transformer winding; sixth, opening the bridged portion of said conductor; and seventh, short-circuiting said second resistor.

4. The combination with an alternating-current motor of the commutator type having an exciting and an inducing field-winding on its stator and having an initially short-circuited armature winding, of a resistor connected in series relation with and intermediate said field windings at starting, a transformer winding for supplying alternating electromotive force, means for excluding said resistor, means for changing to a doubly-fed connection, with said inducing field winding in circuit with a portion of said transformer winding and with the remaining motor windings in circuit with the same resistor across a contiguous portion of the transformer winding, means for opening the short-circuit of said armature winding, means for again excluding said resistor, a second resistor, means for connecting said second resistor across an additional portion of said transformer winding contiguous to said first portion, and means for including said additional portion in circuit with said inducing winding.

5. The combination with an alternating-current motor of the compensated, commutator type, of a resistor, means for initially connecting said motor for repulsion operation with said resistor in series with both the field windings thereof, and means for subsequently connecting said motor for doubly-fed operation with said resistor in series with the main field winding thereof.

6. The method of manipulating an impedance device employed as a current-limiting means in connection with an alternating-current, commutator motor which is started by repulsion operation and subsequently accelerated doubly-fed which comprises connecting said impedance device in series relation with both the main and cross-field windings during repulsion operation and connecting said impedance device in series with the main field winding only, during doubly-fed operation.

In testimony whereof, I have hereunto subscribed my name this 29th day of Dec. 1913.

R. E. HELLMUND.

Witnesses:
 JOHN S. DEAN,
 B. B. HINES.

Copies of this patent may be obtained for five cents each, by addressing the "Commissioner of Patents, Washington, D. C."